(12) United States Patent
Struck et al.

(10) Patent No.: US 9,038,967 B2
(45) Date of Patent: May 26, 2015

(54) FLUID LINE CLAMP

(71) Applicant: Solar Turbines Inc., San Diego, CA (US)

(72) Inventors: Bruno E. Struck, San Diego, CA (US); Eugene R. Hicks, Escondido, CA (US)

(73) Assignee: Solar Turbines Incorporated, San Diego, CA (US)

( * ) Notice: Subject to any disclaimer, the term of this patent is extended or adjusted under 35 U.S.C. 154(b) by 38 days.

(21) Appl. No.: 13/850,432

(22) Filed: Mar. 26, 2013

(65) Prior Publication Data

US 2014/0291455 A1    Oct. 2, 2014

(51) Int. Cl.
   F16L 3/23        (2006.01)
   F16L 3/227       (2006.01)
   F16L 3/12        (2006.01)

(52) U.S. Cl.
   CPC ............................... F16L 3/1207 (2013.01)

(58) Field of Classification Search
   CPC ............. F16L 3/227; F16L 3/23; F16L 3/237; F16L 3/223; F16L 3/2235; F16L 5/00; F16L 3/24; F16L 3/12; F16L 3/10
   USPC ........ 248/68.1, 74.1, 62, 73, 74.2, 74.3, 74.4, 248/316.1, 316.6, 230.1
   See application file for complete search history.

(56) References Cited

U.S. PATENT DOCUMENTS

| 4,036,289 | A  | * | 7/1977 | Cheng et al. ..................... 165/82 |
| 5,271,588 | A  | * | 12/1993 | Doyle .......................... 248/68.1 |
| 5,687,938 | A  | * | 11/1997 | Bailey .......................... 248/74.1 |
| 5,992,802 | A  | * | 11/1999 | Campbell .................... 248/68.1 |
| 7,007,900 | B2 | * | 3/2006 | Goodwin et al. ............. 248/68.1 |
| 7,506,848 | B2 | * | 3/2009 | Heiselbetz et al. ........... 248/200 |
| 7,530,536 | B2 |   | 5/2009 | Hashimoto |
| 7,762,502 | B2 |   | 7/2010 | Mesing et al. |
| 8,267,357 | B2 | * | 9/2012 | Kataoka et al. .............. 248/68.1 |
| 8,294,030 | B2 | * | 10/2012 | Pollard, Jr. .................... 174/155 |
| 8,695,929 | B2 | * | 4/2014 | Cox .............................. 248/68.1 |
| 2004/0124320 | A1 | * | 7/2004 | Vantouroux ................. 248/68.1 |
| 2006/0091266 | A1 | * | 5/2006 | Leiser et al. ................. 248/68.1 |
| 2006/0249636 | A1 | * | 11/2006 | Thiedig et al. ............... 248/74.4 |
| 2011/0080078 | A1 | * | 4/2011 | Perschon et al. ........... 312/293.1 |
| 2011/0253846 | A1 | * | 10/2011 | Kataoka et al. .............. 248/68.1 |
| 2012/0280092 | A1 | * | 11/2012 | Barre et al. ................... 248/68.1 |
| 2013/0056591 | A1 | * | 3/2013 | Mongiorgi et al. .......... 248/68.1 |
| 2013/0114236 | A1 | * | 5/2013 | Parry-Jones et al. ......... 361/826 |

* cited by examiner

*Primary Examiner* — Nkeisha Smith
(74) *Attorney, Agent, or Firm* — Procopio, Cory, Hargreaves & Savitch LLP

(57) ABSTRACT

A fluid line clamp includes one or more blocks with holes for receiving fluid lines therein. The fluid line clamp further includes a first backing plate, a second backing plate, and a shielding plate. The first and second backing plates are spaced apart from each other to receive the blocks therebetween. The shielding plate is disposed at a distance from the blocks and includes an inner surface, and an outer surface. The inner surface of the shielding plate is rigidly attached to the backing plates. The outer surface of the shielding plate is configured to rigidly attach to a hot body of a machine.

17 Claims, 3 Drawing Sheets

FLUID LINE CLAMP

TECHNICAL FIELD

The present disclosure relates to a fluid line clamp and more particularly to a fluid line clamp for fluid lines disposed alongside a hot body of a machine.

BACKGROUND

Typically, fluid lines routed from one location to another location of a machine may be exposed to heat radiating from a hot body of the machine. Further, clamps used to bind or organize the fluid lines alongside the body may also experience a similar situation and fail to maintain the fluid lines therein. Furthermore, the clamps when fastened using fasteners may tend to crack under a combined effect of the radiating heat and the compression of the fasteners.

U.S. Pat. No. 5,271,588 relates to a clamp for mounting a tube to a support plate in a gas turbine engine. The clamp includes a base plate and a capture plate for capturing the tube therebetween, with a fastener positionable through the base and capture plates for clamping them together and mounting the tube to the support plate. A tubular retainer extends through the base and capture plates for retaining them together when the fastener is removed.

SUMMARY

In one aspect, the present disclosure provides a fluid line clamp including one or more blocks with holes for receiving fluid lines therein. The fluid line clamp further includes a first backing plate, a second backing plate, and a shielding plate. The first and second backing plates are spaced apart from each other to receive the blocks therebetween. The shielding plate is disposed at a distance from the blocks and includes an inner surface, and an outer surface. The inner surface of the shielding plate is rigidly attached to the backing plates. The outer surface of the shielding plate is configured to rigidly attach to a hot body of a machine.

In another aspect, the present disclosure provides a fluid line assembly for a machine having a hot body. The fluid line assembly includes one or more fluid lines disposed alongside the hot body, and a fuel line clamp. The fuel line clamp includes one or more blocks with holes for receiving the fluid lines therein. The fluid line clamp further includes a first backing plate, a second backing plate, and a shielding plate. The first and second backing plates are spaced apart from each other to receive the blocks therebetween. The shielding plate is disposed at a distance from the blocks and includes an inner surface, and an outer surface. The inner surface of the shielding plate is rigidly attached to the backing plates. The outer surface of the shielding plate is configured to rigidly attach to the hot body of the machine.

Other features and aspects of this disclosure will be apparent from the following description and the accompanying drawings.

DETAILED DESCRIPTION

Figure 1:
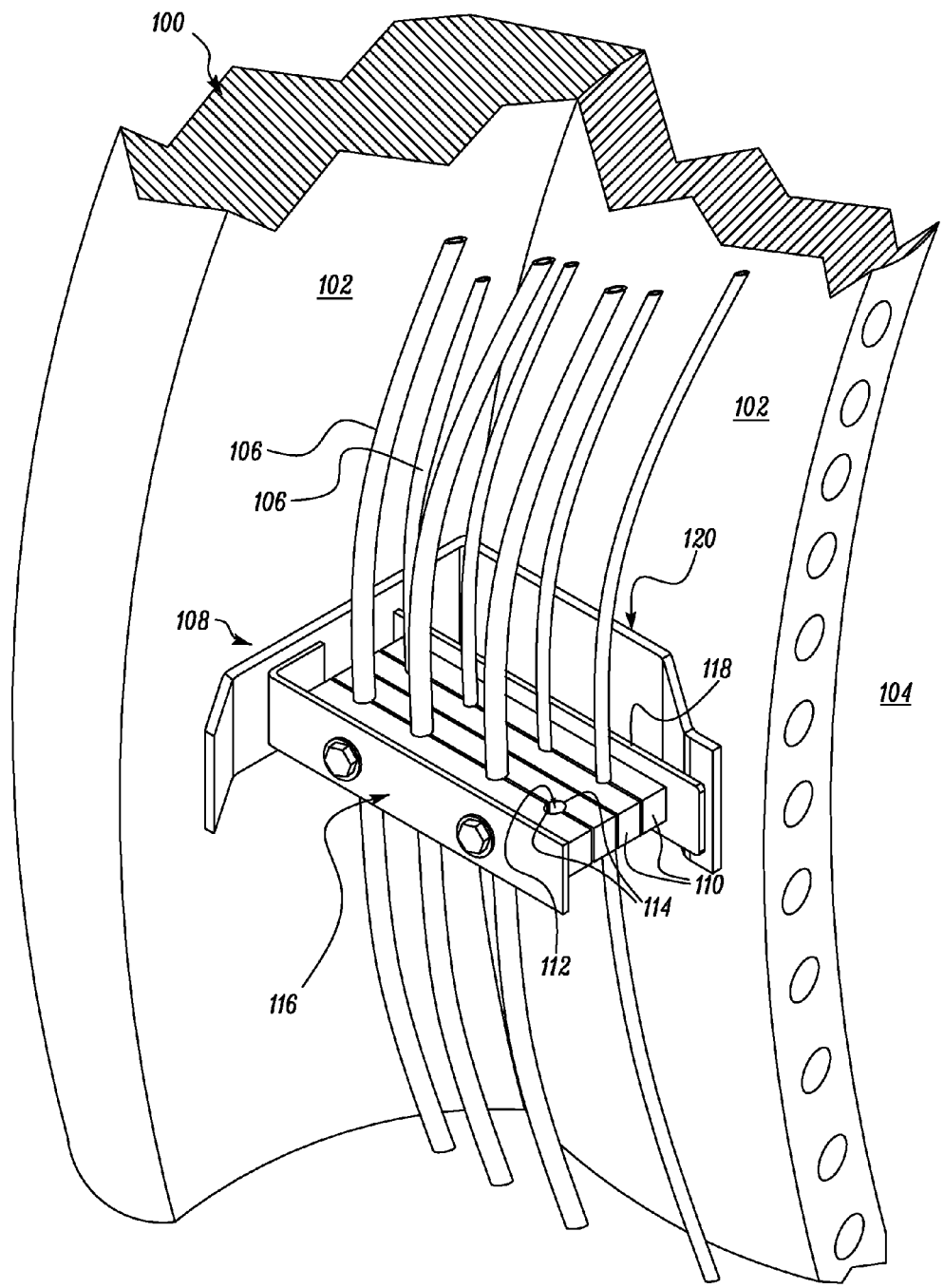
FIG. 1 is a breakaway perspective view of an exemplary machine in accordance with an embodiment of the present disclosure.

The present disclosure relates to a clamp for fluid lines disposed alongside a hot body of a machine. FIG. 1 shows a perspective view of a machine 100 in accordance with an exemplary embodiment of the present disclosure. In one embodiment as shown in FIG. 1, the machine 100 may embody a gas turbine engine. The gas turbine engine may be of any type. In one embodiment, the gas turbine engine may be used to drive a generator for power generation, or other mechanical assemblies such as a compressor. In other embodiments, the machine 100 may be any other type of engine, or device such as motors, compressors.

In an embodiment as shown in FIG. 1, the machine 100 may include a hot body 102 that produces heat during operation, and radiates the heat into a surrounding environment 104. A fluid line assembly includes one or more fluid lines 106 disposed alongside the hot body 102. In one embodiment, the fluid lines 106 may be configured to supply fuel to the gas turbine engine. However, in other embodiments, the fluid lines 106 may be configured to carry any type of fluid associated with a working of the machine 100.

The fluid line assembly further includes a fluid line clamp 108 configured to reduce heat transfer from the hot body 102 to the fluid lines 106. The fluid line clamp 108 includes one or more blocks 110 with holes 112 for receiving the fluid lines 106 therein. In an embodiment as shown in FIG. 1, the blocks 110 may include a set of arcuate recesses 114 in one block 110 conjugate to a set of arcuate recesses 114 in the other block 110 such that the arcuate recesses 114 define the holes 112 upon joining the blocks 110. The holes 112 may be configured to allow passage of fluid lines 106 therein.

The fluid line clamp 108 further includes a first backing plate 116, a second backing plate 118, and a shielding plate 120. The first and second backing plates 116, 118 are spaced apart from each other and together receive the blocks 110 therebetween. In an embodiment as shown in FIG. 1, the first and the second backing plate 118 may be substantially parallel to each other. The substantially parallel backing plates may be configured to receive the substantially rectangular shaped blocks 110 therebetween. In other embodiments, the first and second backing plates 116, 118 may be in any other angular relation to each other based on a shape of the blocks 110.

Figure 2:
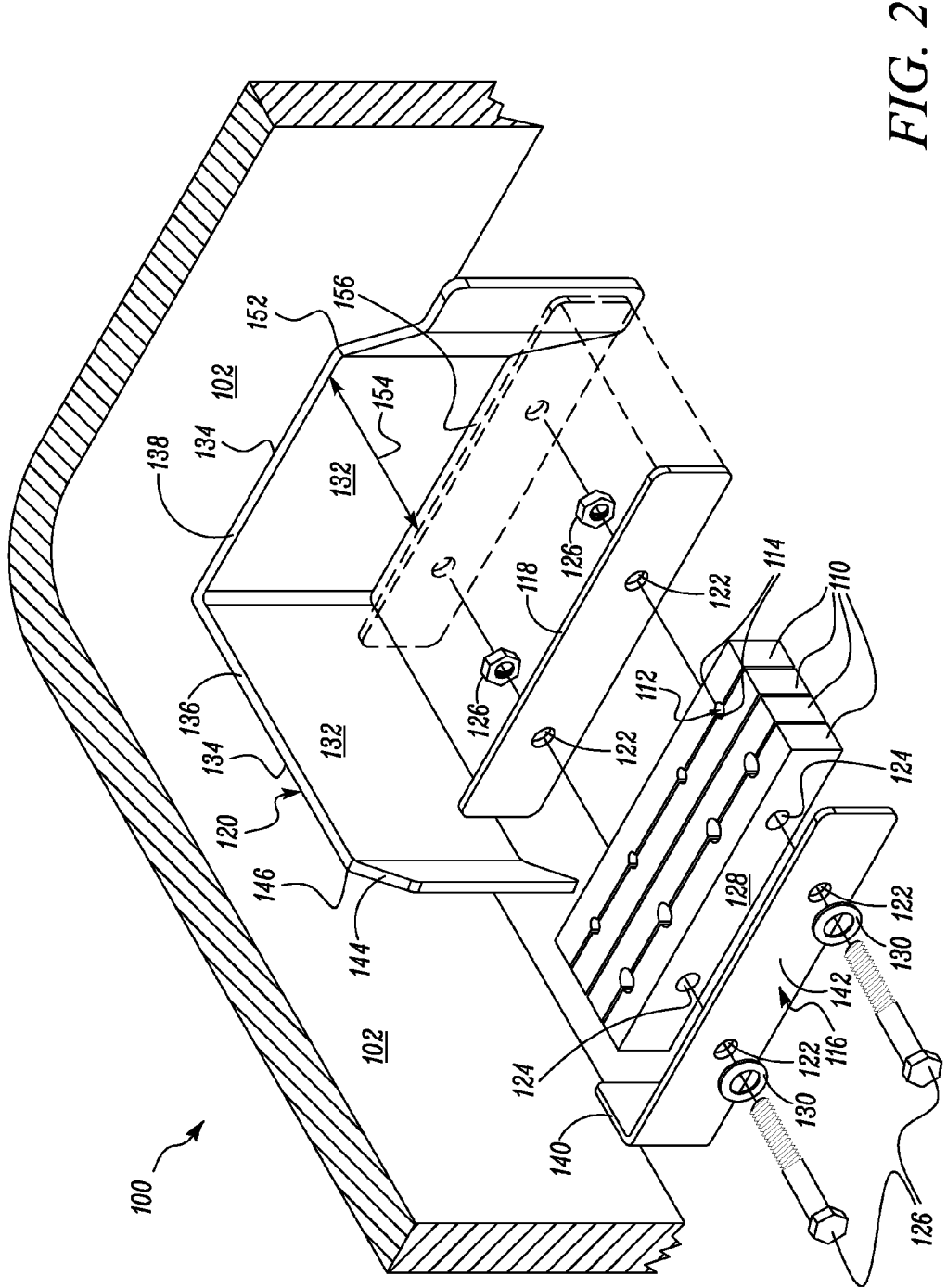
FIG. 2 is an exploded view of a fluid line clamp employed in the exemplary machine of FIG. 1.

In an embodiment as shown in FIG. 2, the first and second backing plates 116, 118 may include axially aligned openings 122 therein. Further, each of the blocks 110 may include a set of axially aligned openings 124 disposed therein. The openings 124 on the blocks 110 may correspond to the openings 122 on the first and second backing plates 116, 118. The openings 122, 124 may be configured to receive threaded fasteners 126 and releasably fasten the blocks 110 between the first and second backing plates 116, 118. The threaded fasteners 126 disclosed herein may be commonly known fasteners, such as bolts and nuts.

In an embodiment, the first and second backing plates 116, 118 may be configured to distribute a compression of the threaded fasteners 126 across adjoining surfaces 128 of the blocks 110. Although it may not be evident to one having ordinary skill in the art, the threaded fasteners 126 exert a compression force on the blocks 110 when fastened. The first and the second backing plates 116, 118 may be of a larger surface area than the adjoining surfaces 128 of the blocks 110 thus absorbing a substantially larger amount of compression force as compared to the blocks 110.

In an embodiment as shown in FIG. 2, the fluid line clamp 108 may further include washers 130 disposed between the threaded fasteners 126 and the first backing plate 116. The washers 130 may be configured to distribute a net force of the threaded fasteners 126 on the first backing plate 116. In some embodiments, the washers 130 may be of a Belleville type whereby the washers 130 may be further configured to axially bias the threaded fasteners 126 away from the first backing plate 116.

The shielding plate 120 includes an inner surface 132, and an outer surface 134. The inner surface 132 is rigidly attached to the backing plates and the outer surface 134 is configured to rigidly attach to the hot body 102 of the machine 100. In an embodiment as shown in FIG. 2, the shielding plate 120 may be substantially L-shaped. The L-shaped shielding plate 120 may include a first portion 136, and a second portion 138 angularly extending from the first portion 136. Although a substantially L-shaped shielding plate 120 is disclosed herein, a person having ordinary skill in the art may acknowledge that the L-shape is merely exemplary in nature and therefore, any appropriate shape such as C-shape or G-shape may be used to form the shielding plate 120.

In the preceding embodiment, the outer surface 134 at the first portion 136 may be configured to rigidly attach to the hot body 102 while the inner surface 132 is rigidly attached to the first backing plate 116. Similarly, the inner surface 132 at the second portion 138 is rigidly connected to the second backing plate 118. In one embodiment, the rigid attachments disclosed herein may be accomplished by welding. However, the rigid attachments may also be accomplished using soldering, brazing or other methods commonly known in the art.

In one embodiment, the outer surface 134 at the second portion 138 may be spaced apart from the hot body 102. In an alternative embodiment, the outer surface 134 at the second portion 138 may be rigidly attached to the hot body 102. Alternatively, the outer surface 134 at both portions 136, 138 of the shielding plate 120 may be rigidly attached to the hot body 102 thus firmly securing the shielding plate 120 to the hot body 102. Therefore, it may be noted that a location of rigid attachment on the outer surface 134 to the hot body 102 disclosed herein is merely exemplary in nature. The outer surface 134 at any portion 136, 138 or alternatively both portions 136, 138 may be used to rigidly attach the shielding plate 120 to the hot body 102.

In an embodiment as shown in FIG. 2, the first backing plate 116 may be L-shaped and may include a first tab 140, and a second tab 142. The first tab 140 may be configured to rigidly attach on the inner surface 132 at the first portion 136 of the shielding plate 120 while the second tab 142 may laterally extend from the first tab 140 and abut the block.

In an embodiment as shown in FIG. 2, the shielding plate 120 further includes a bent portion 144 angularly extending from an end 146 of the first portion 136. The bent portion 144 may be configured to reduce heat transfer from the hot body 102 to the second tab 142. Various dimensional parameters of the bent portion 144, such as a length, and breadth of the bent portion 144 may be selected such that the bent portion 144 is adequately facing the hot body 102 to reduce heat transfer from the hot body 102 to the second tab 142.

In an embodiment as shown in FIG. 2, the shielding plate 120 may further include a ramp portion 148, and a land portion 150. The ramp portion 148 may angularly extend from an end 152 of the second portion 138 while the land portion 150 may angularly extend from the ramp portion 148. The land portion 150 may be configured to rigidly attach to the second backing plate 118 and dispose the second backing plate 118 at a distance 154 from the second portion 138 of the shielding plate 120 thus defining a first air gap 156.

Figure 3:
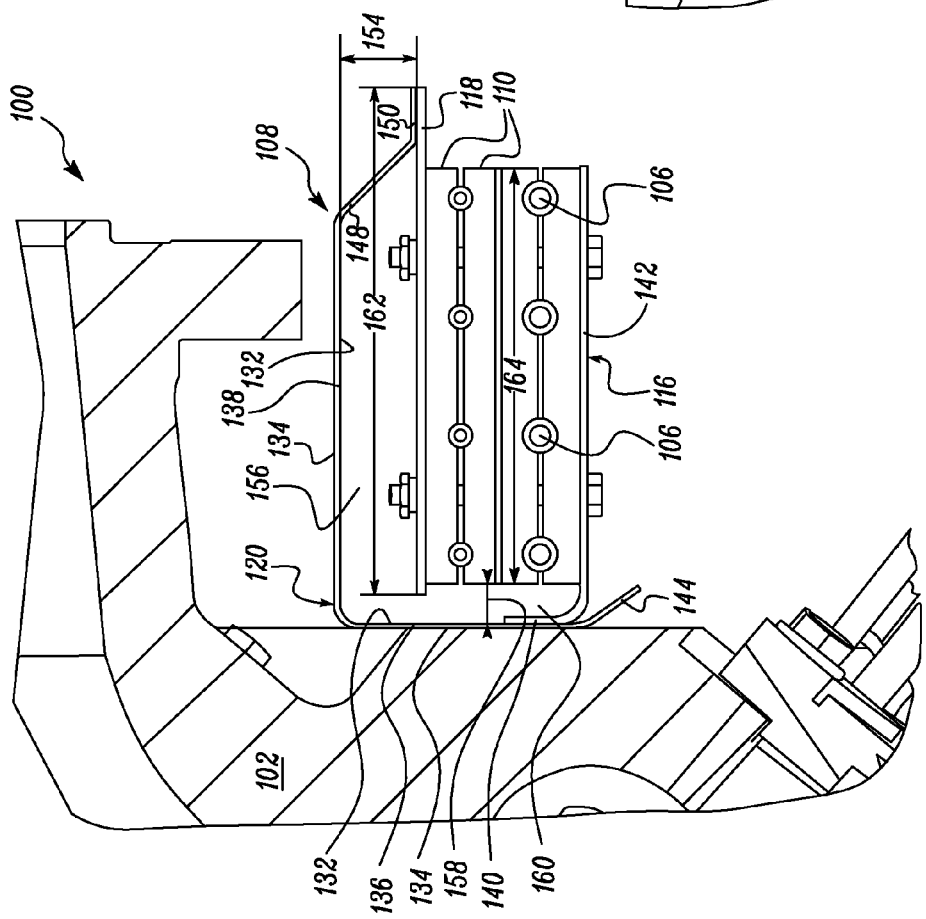

As shown in FIG. 3, the shielding plate 120 is disposed at a distance 158 from the blocks 110. This distance 158 defines a second air gap 160 between the shielding plate 120 and the blocks 110. In an embodiment as shown in FIG. 3, a length 162 of the second backing plate 118 may be greater than a length 164 of the blocks 110, and a length of the first backing plate 116. The greater length 162 of the second backing plate 118 may allow the openings 122 therein to be located such that during assembly, the openings 122 on the first backing plate 116, and the openings 124 on the blocks 110 line up with the openings 122 on the second backing plate 118 to position the blocks 110 away from the first portion 136 of the shielding plate 120.

During operation of the machine 100, heat may be radiated from the hot body 102. However, the first and the second air gaps 156, 160 disclosed herein may be configured to provide a substantially long conduction path to the heat radiated from the hot body 102. Thus, the first and second air gaps 156, 160 may create a temperature gradient across the distances 154, 158 and hence, may reduce heat transfer from the hot body 102 to the blocks 110 directly, or to the blocks 110 via the second backing plate 118. The temperature gradient of the air gap may keep the second backing plate 118 and the abutting blocks 110 relatively cooler than a surface temperature of the hot body 102. Further, in a preceding embodiment disclosed herein, the bent portion 144 may also reduce heat transfer from the hot body 102 to the first tab 140 and the blocks 110 abutting the first tab 140.

In an exemplary embodiment, the surface temperature of the hot body 102 may be T(x, y, z), wherein x, y, and z are spatial co-ordinates of a point on the hot body 102. Further, the temperature $T_1$ at the blocks 110 may be a function of the surface temperature of the hot body 102 and may be given by the following equation:

$$T_1 = [T(x,y,z) - [T(x,y,z)*X]] \qquad \text{eq. 1;}$$

wherein X is the temperature gradient and may be derived from the following equation:

$$X = (\delta T/\delta x, \delta T/\delta y, \delta T/\delta z) \qquad \text{eq. 2.}$$

Thus, from equation 1, it can be seen that the temperature T1 at the blocks 110 may be lesser than the temperature of the hot body 102 thus indicating that the blocks 110 may be disposed in a cooler zone as compared to any point located in a vicinity of the hot body 102. Further, the lesser temperature of the blocks 110 may also indicate that the air gaps 156, 160 disposed between the blocks 110 and the hot body 102 may be configured to reduce heat transfer by the temperature gradient at the air gaps 156, 160.

Figure 4:
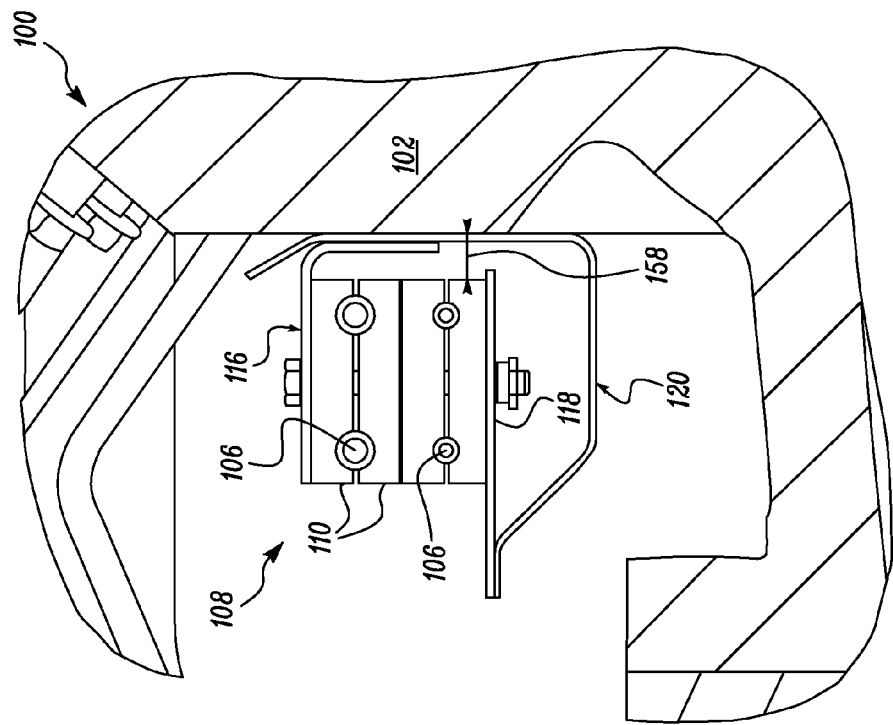
FIGS. 3-4 are orthogonal views of the exemplary machine.

Although a specific number of holes 112 are included in the blocks 110 shown in the FIGS. 1-3, it is to be noted that the specific number of holes 112 is merely exemplary in nature, and hence, non-limiting of this disclosure. In an embodiment, the number of holes 112 on the blocks 110 may be based on a number of fluid lines 106 disposed therein. In some embodiments, it may be possible to dispose more than one fluid line 106 in a given hole 112 of the block 110. FIG. 4 shows the blocks 110 including four holes 112 that are configured to receive four fluid lines 106. Hence, it is to be noted that the blocks 110 may include any number of holes 112 therein.

INDUSTRIAL APPLICABILITY

Typically, fluid lines routed from one location to another location of a machine may be exposed to heat radiating from the machine. The heat radiating from the machine may deteriorate the fluid lines. Further, clamps used to bind or organize the fluid lines alongside a hot body of the machine may also experience a similar situation and fail to maintain the fluid lines therein. Furthermore, the clamps when fastened using fasteners may tend to crack under a combined effect of the radiating heat and the compression of the fasteners.

Clamps typically made of phenolic and other allied compounds may have a tendency to become hard and brittle when exposed to heat. Further, the clamps may also crack or disintegrate thus compromising a securement of the fluid lines disposed therein. Unsecured fluid lines 106 running alongside a hot body of a machine may disintegrate thus entailing a replacement of the clamp or re-routing of fluid lines with or without the clamp. The replacement of fluid lines may be labor intensive and expensive. Subsequently, the machine may be subjected to downtimes during replacement of fluid lines 106 and this may affect associated work processes and profitability associated with running the machine.

The fluid line clamp 108 disclosed herein is configured to dispose the blocks 110 at distances 154, 158 from the first portion 136 and the second portion 138 respectively thus providing the air gaps 156, 160 between the blocks 110 and the hot body 102. Therefore, heat radiating from the hot body 102 of the machine 100 may reduce in intensity before reaching the blocks 110 thus allowing the blocks 110 to stay relatively cooler when compared to a temperature of the hot body 102. This cooler temperature of the blocks 110 may prolong a service life of the blocks 110.

Further, in embodiments where threaded fasteners 126 are used to fasten the blocks 110 between the backing plates, a compression force of the threaded fasteners 126 may be distributed across an area of the backing plates. The distribution of the compression forces across the backing plates mitigates a risk of the blocks 110 becoming brittle and cracking under a combined effect of the heat and the compression force. Hence, the backing plates may also contribute in prolonging the service life of the blocks 110.

The fluid line clamp 108 disclosed herein may be manufactured using commonly known processes in the art such as welding, brazing, soldering and the like. Therefore, the fluid line clamp 108 is simple and economical to manufacture and may be quickly attached onto the hot body 102 of the machine 100. During operation of the machine 100 the fluid line clamp 108 may prevent the blocks 110 and the fluid lines 106 from disintegrating upon exposure to heat. Therefore, the fluid line clamp 108 may avoid frequent replacement of the blocks 110 and the fluid lines 106 thus saving costs and increasing profitability associated with operation of the machine 100.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A fluid line clamp comprising:
    one or more blocks with holes for receiving fluid lines therein;
    a first backing plate and a second backing plate spaced apart from each other to receive the blocks therebetween; and
    a substantially L-shaped shielding plate rigidly attached to the first backing plate and the second backing plate, the shielding plate having a first portion and a second portion angularly extending from the first portion,
    the first portion disposed at a first distance from the blocks thereby defining a first air gap therebetween and
    the second portion disposed at a second distance from the second backing plate thereby defining a second air gap therebetween.

2. The fluid line clamp of claim 1, wherein the first backing plate is L-shaped and includes:
    a first tab rigidly attached on an inner surface of the first portion of the shielding plate; and
    a second tab laterally extending from the first tab and abutting the block.

3. The fluid line clamp of claim 2, wherein the shielding plate further includes a bent portion angularly extending from an end of the first portion, the bent portion configured to reduce heat transfer from a hot body to the second tab.

4. The fluid line clamp of claim 1, wherein the shielding plate further includes:
    a ramp portion angularly extending from an end of the second portion; and
    a land portion angularly extending from the ramp portion, the land portion rigidly attached to the second backing plate with the second backing plate disposed at the second distance from the second portion of the shielding plate.

5. The fluid line clamp of claim 4, wherein a length of the second backing plate is greater than a length of the blocks, and a length of the first backing plate.

6. The fluid line clamp of claim 1, wherein the first and second backing plates are substantially parallel to each other and include axially aligned openings therein, the openings configured to receive threaded fasteners.

7. The fluid line clamp of claim 6, wherein the backing plates are configured to distribute a compression of the threaded fasteners across adjoining surfaces of the blocks.

8. A fluid line assembly for a machine having a hot body, the fluid line assembly comprising:
    one or more fluid lines disposed alongside the hot body; and
    a fluid line clamp including:
        one or more blocks with holes for receiving the fluid lines therein;
        a first backing plate and a second backing plate spaced apart from each other to receive the blocks therebetween; and
        a shielding plate disposed at a distance from the blocks, the shielding plate including:
            an inner surface; and
            an outer surface configured to rigidly attach to the hot body of the machine;
            wherein the shielding late is substantially L-shaped and includes
                a first portion,
                a second portion angularly extending from the first portion,
                a ramp portion angularly extending from an end of the second portion, and
                a land portion angularly extending from the ramp portion, the land portion rigidly attached to the second backing plate with the second backing plate disposed at a distance from the second portion of the shielding plate.

9. The fluid line assembly of claim 8, wherein the second portion is spaced apart from the hot body.

10. The fluid line assembly of claim 8, wherein the first backing plate is L-shaped and includes:
- a first tab rigidly attached on the inner surface at the first portion of the shielding plate; and
- a second tab laterally extending from the first tab and abutting the one or more blocks.

11. The fluid line assembly of claim 10, wherein the shielding plate further includes a bent portion angularly extending from an end of the first portion, the bent portion configured to reduce heat transfer from the hot body to the second tab.

12. The fluid line assembly of claim 8, wherein a length of the second backing plate is greater than a length of the blocks, and a length of the first backing plate.

13. The fluid line assembly of claim 8, wherein the first and second backing plates are substantially parallel to each other and include axially aligned openings therein, the openings configured to receive threaded fasteners.

14. The fluid line assembly of claim 13, wherein the backing plates are configured to distribute a compression of the threaded fasteners across adjoining surfaces of the blocks.

15. A machine including:
- a hot body configured to radiate heat; and
- employing a fluid line clamp comprising: one or more blocks with holes for receiving fluid lines therein; a first backing plate and a second backing plate spaced apart from each other to receive the blocks therebetween; and a substantially L-shaped shielding plate rigidly attached to the first backing plate and the second backing plate, the shielding plate having a first portion and a second portion angularly extending from the first portion, the first portion disposed at a first distance from the blocks thereby defining a first air gap therebetween and the second portion disposed at a second distance from the second backing plate thereby defining a second air gap therebetween.

16. The machine of claim 15, wherein the machine is a gas turbine engine.

17. The machine of claim 15, wherein the fluid lines are configured to transport fuel.

* * * * *